Oct. 17, 1950  R. W. GREGSON  2,525,896
DISTORTION CORRECTION FOR STEAM ENGINE VALVE GEARS
Filed March 22, 1947  2 Sheets-Sheet 2
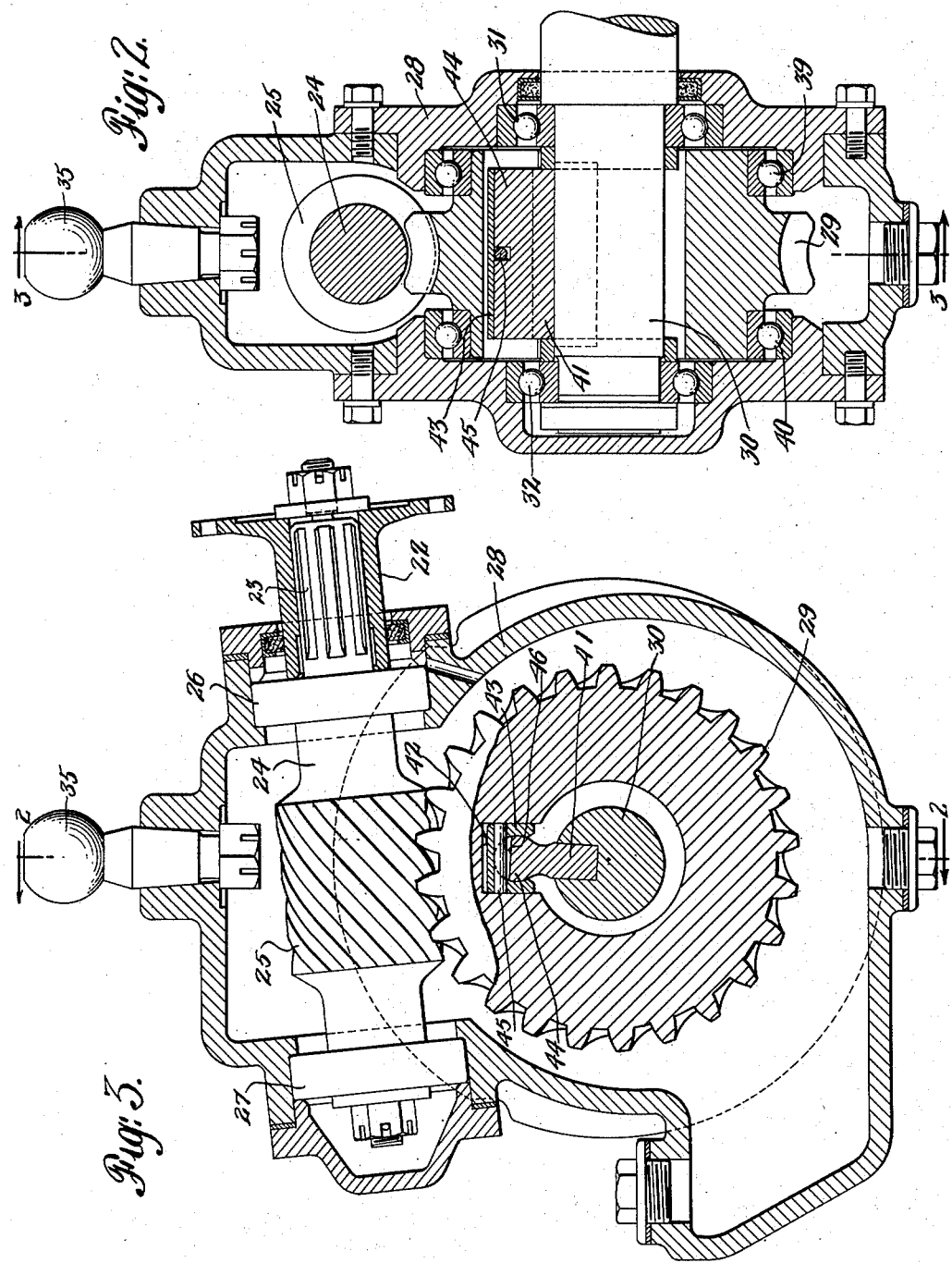
INVENTOR
Robert W. Gregson
BY
ATTORNEYS Patented Oct. 17, 1950

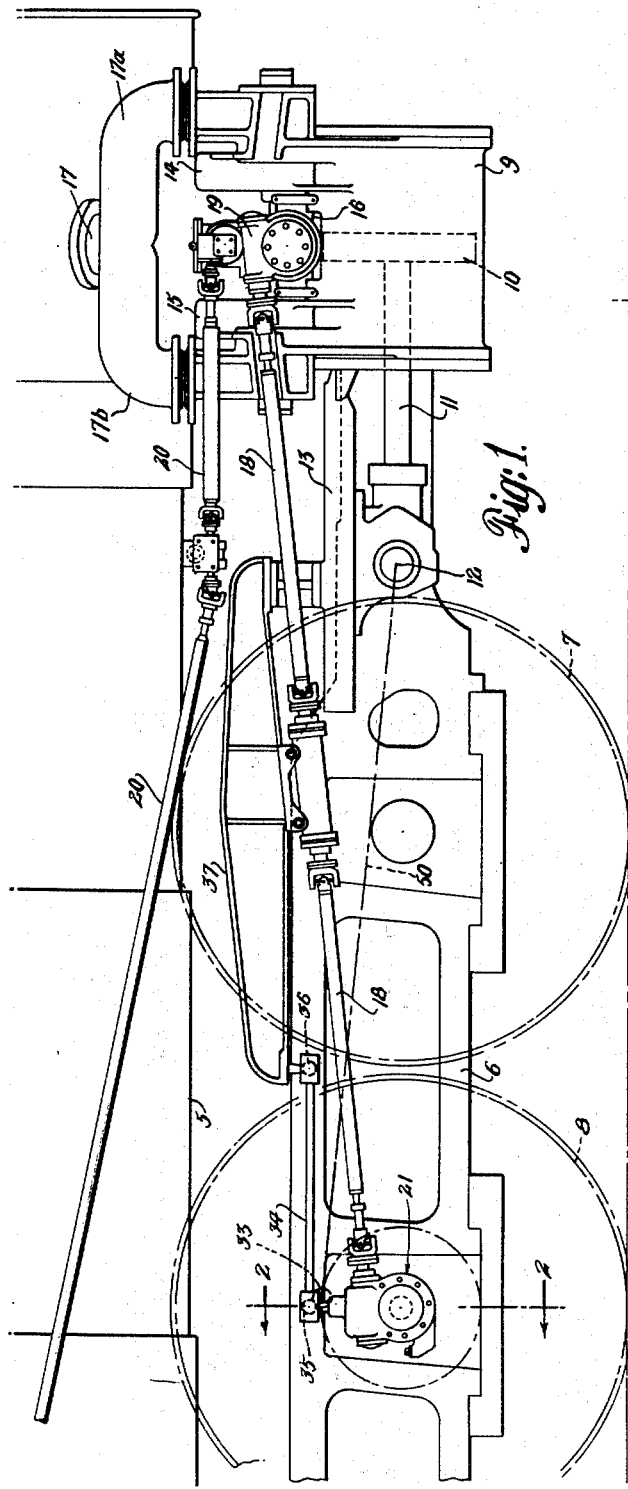

2,525,896

UNITED STATES PATENT OFFICE 2,525,896

DISTORTION CORRECTION FOR STEAM ENGINE VALVE GEARS

Robert W. Gregson, Baltimore, Md., assignor, by mesne assignments, to Franklin Railway Supply Company, Wilmington, Del., a corporation of Delaware Application March 22, 1947, Serial No. 736,477

6 Claims. (Cl. 121—167)

This invention relates to engine valve gear, and is especially concerned with valve gear of a type incorporating a continuously rotating valve controlling device, such, for example, as a valve actuating cam shaft for a poppet valve-equipped locomotive.

The primary object of the present invention is to increase the accuracy of timing of valve events with relation to the piston stroke, especially in an engine in which the valves are actuated by a continuously rotating valve controlling device, such as the cam shaft of a poppet valve-equipped locomotive engine.

As is known, in a conventional steam locomotive the piston is connected with a crosshead, which latter, in turn, is coupled by a connecting rod with a crank on one of the driving wheels. Because of this the reciprocating motion of the crosshead (and thus also of the piston) is distorted from true phase relation to the rotary motion of the driving wheel, because of the angularity of the connecting rod at various points in each cycle of operation. In poppet valve-equipped engines it has been common to actuate the valves by means of a continuously rotating cam shaft and the drive for such cam shaft has commonly been secured by directly gearing the cam shaft to the driving wheel in a manner to effect rotation of the cam shaft in exact phase relationship with rotation of the driving wheel. In this common prior arrangement, therefore, the rotative motion of the cam shaft, while in phase with the driving wheel, is distorted from true phase relation to the reciprocating motion of the piston; and this has introduced inaccuracies in the timing of valve events with relation to piston stroke.

According to the invention, drive means are provided for the cam shaft of an engine of the type described above (or for other equivalent continuously rotatable valve controlling means), the drive means effecting drive of the cam shaft in true phase relation to the motions of the piston.

How the foregoing and other objects and advantages of the invention are attained will appear more fully from the following description referring to the accompanying drawings in which—

Figure 1 is a somewhat diagrammatic outline view of forward portions of a locomotive, including a cylinder, crosshead, drive wheels and portions of the steam distribution and control system;

Figure 2 is a sectional view, on an enlarged scale, of a portion of the drive mechanism employed for the valve gear, this figure being taken substantially as indicated by the section line 2—2 on Figures 1 and 3;

Figure 3 is a sectional view of the mechanism shown in Figure 2, the view being taken as indicated by the section line 3—3 on Figure 2; and Figure 4 is a diagram illustrating the operation of valve gear drive means constructed according to the invention.

In Figure 1 a portion of the forward end of a locomotive boiler is indicated at 5. A main frame member appears at 6, this frame having the customary pedestal jaws for mounting driving axles for carrying driving wheels such as shown in outline at 7 and 8.

For purposes of illustration herein it is assumed that the locomotive incorporates a pair of cylinders, one of which is shown at 9, this cylinder having a piston 10 working therein, with its piston rod 11 projecting through the rear of the cylinder and associated with the crosshead 12 which in turn is associated with the crosshead guide 13.

Above and toward opposite ends of the cylinder 9 are forward and rear valve chests 14 and 15, adapted to house poppet valves with the stems thereof projecting into the intervening space between the chests for cooperation with valve actuating mechanism such as the cam box 16. The main steam pipe 17 at the near side of the locomotive when viewed as in Figure 1 is branched as at 17a—17b, the two branches being extended respectively to the forward and rear valve chests for delivery of steam thereto. Exhaust steam may be discharged through exhaust passages extended inwardly from the cylinders at the two sides of the locomotive, for ultimate discharge through the smoke box and stack, as is customary in this art.

Certain features of the general arrangement above referred to are more fully disclosed in copending application, Serial No. 525,180 of Julius Kirchhof and Raymond P. Delano, Jr., filed March 6, 1944, now Patent No. 2,441,199, and since various features of the general arrangement form no part of the present invention per se they are only briefly described herein.

As is also more fully disclosed in said copending application the cam box 16 is adapted to support and house a cam shaft rotating about an axis extended transversely of the locomotive and driven by shafting 18 through gearing housed at 19. Adjustment of the timing of the valve events and reversal of the operation of the engine may be effected by means of the control shafting 20 extended to the cab of the locomotive. For a disclosure of a typical reversible and adjustable cam actuating mechanism suitable for use with the valve gear drive means of the present invention, reference may be had to the patent above referred to.

The drive shafting 18 is extended rearwardly and downwardly for connection with a driving unit generally designated by the numeral 21 in Figure 1 and shown in detail in Figures 2 and 3, this unit being associated with an axle of a pair of driving wheels.

Referring now to Figures 2 and 3, the rear end of the shafting 18 is adapted to be coupled with the external part 22 of a splined connection, the internal part 23 of which constitutes an extension from the shaft 24 of a worm 25, this worm being journalled by means of bearings 26 and 27 in a housing 28, which housing also serves to mount the worm wheel 29. The housing is journalled on and carried by a pin 30, bearings 31 and 32 being provided for this purpose, which pin is arranged coaxially with the axle of the driving wheel 8 on a return-crank, i. e., a crank extended radially inwardly from the main crank pin indicated at 33 in Figure 1. Such a return-crank is also shown in the copending application above mentioned. Rotation of the housing is prevented by means of a link 34 having a socket cooperating with the ball 35 of a ball and socket connection with the housing 28. The other end of this link is also connected by a ball and socket at 36 with a supporting bracket 37. By this arrangement the driving unit 21 is restrained as against undesired motions, while accommodating motions permitted by the spring support of the locomotive frame on the driving axle.

The worm gear 29 is also journalled in housing 28, bearings 39 and 40 being provided for this purpose and the worm gear is adapted to be rotated by means of a crank 41 fitted in a keyway in the return-crank pin 30 and projecting therefrom into a groove or recess 42 formed in the hub of the gear 29. The drive connection between the pin 30 and the gear 29 further includes a shoe 43 having an internal partly cylindrical groove adapted to engage a correspondingly shaped end portion 44 of the crank 41. Movement of the shoe 43 axially of the gear 29 is prevented by means of a pin 45 which is extended through the shoe and which engages in a slot 46 formed in part 44.

By virtue of the mounting and drive arrangements described above the gear 29 is caused to rotate in a 1:1 ratio with the driving wheel 8 and this in turn drives shafting 18 through the worm 25 which is extended forwardly to the region of the cam box (see Figure 1). Gearing enclosed at 19 (see Figure 1) is complementary to that shown in Figures 2 and 3, i. e., shaft 18 drives a worm diagrammatically shown at 47 which in turn engages a worm wheel 48 (see Figure 4) mounted on the transversely extended cam shaft indicated at 49.

Attention is now called to the fact that as shown in Figure 3, the gear 29 is journalled in the housing 28 eccentrically with relation to the return-crank pin 30 and thus also with relation to the axle of the driving wheel 8. The reason for and the sense of this eccentricity is described herebelow with more particular reference to Figure 4. It is here noted, however, that as shown in Figure 1 crosshead 12 is adapted to be coupled with the main crank pin 33 by means of a connecting rod diagrammatically indicated at 50.

In the diagram of Figure 4, $a$ indicates the center of rotation of the driving wheel 8. The main crank 33 is also here indicated in several positions in its circle of rotation at 33$a$, 33$b$ and 33$c$. Several positions of the connecting rod 50 (and thus also of the main crank pin 33) are also diagrammed in this figure. These positions include a position 50$a$ which corresponds to the midposition of the stroke of the piston 10 in the cylinder 9. It will be noted that the forward end of the connecting rod in this position lies at point $b$ along the horizontal line $x$—$x$ passing through the center $a$ of the driving wheel. A scale of piston stroke positions has been applied to line $s$—$s$, this scale reading in per cent and indicating piston position from the commencement to the end of its forward stroke along the line $x$—$x$.

The main driving gear 29 is also indicated in outline, this gear being shown as eccentric with relation to the center of the driving wheel $a$, with its center $c$ offset along line $x$—$x$ toward the right. It should be kept in mind that the gear 29 is journalled (in the mounting casing shown at 28 in Figures 2 and 3) in such a manner that the axis or center $c$ thereof is always maintained in the same offset relation from point $a$, regardless of the position of rotation of the driving wheel.

For the purpose of demonstration of the principle of operation, the diagram of Figure 4 shows an arm 51 which is fixed for rotation with the gear 29, the arm having a slot 52 at its outer end which is shown in engagement with the main crank 33. This arm constitutes the driving arrangement for the gear 29 in the diagram of Figure 4 and it will be seen that as the driving wheel rotates, the gear 29 is driven in a 1:1 ratio, but with a once-per-revolution acceleration and deceleration with respect to the driving wheel. The slot 52 at the outer end of the driving arm makes accommodation for the eccentricity between the center of the driving wheel $a$ and the center of the gear $c$, as will readily be seen from inspection of the broken line position of the arm at 51$a$ cooperating with the main crank at the position 33$c$.

The drive from the main driving gear 29 forwardly to the cam shaft is also shown in Figure 4. Thus, shafting 18 is diagrammatically illustrated, the shafting having a worm 25 at its rear end in engagement with gear 29 and a worm 47 at its forward end in engagement with gear 48 which is fixed to the cam shaft shown at 49. Gears 29 and 48 are shown as having the same diameter, in view of which the two gears will always rotate in a 1:1 ratio and in an exact phase relationship.

From the diagram it will appear that with the center $c$ of the gear 29 offset from the wheel center $a$ to the point of intersection of a perpendicular drawn from crank position 33$a$ to the line $x$—$x$, $c$—33$a$ and $b$—$d$ are both vertical lines, the latter line $b$—$d$ passing through a reference point on the cam shaft 49 which, for convenience, may be the cam shaft keyway 49$a$. If now the piston moves from the center position $b$ (50% of the stroke) to the 75% position indicated at $e$, the main crank has moved to position 33$d$ in which line $c$—33$d$ is parallel to $b$—$e'$ and the gear 48 and the connected cam shaft is moved through a corresponding angle, bringing the keyway 49$a$ to line $b$—$e'$. Thus, the gear 48 and the cam shaft 49 are still in phase with piston movement. Similarly, the keyway 49a will lie on line b—f' when the piston is at the 25% position indicated at f, in which position the main crank is located at 33e, line c—33e and b—f' being parallel.

Naturally the cam shaft and the piston are also in phase when the main crank is in position 33c or in position 33f, these positions corresponding respectively to the zero and 100% positions of the piston stroke.

A corresponding effect occurs upon the return stroke of the piston, position 33b of the main crank corresponding to the 50% position of the piston in its return stroke.

By way of further explanation, the foregoing functioning may be contrasted with the timing of valve events which would occur as a result of mounting of the main driving gear 29 concentric with the center a of the driving wheel (which is the usual case). In such case the rotation of the cam shaft would be in a ratio of 1:1 with respect to the driving wheel and in exact phase relationship. However, the motion of the crosshead and the piston connected therewith is distorted from true phase relation to the motion of the driving wheel because of the angularity of the connecting rod at various positions in the cycle of operation. Therefore, the usual arrangement of the driving gear 29 concentric with the wheel center results in a timing of valve events which is distorted from true phase relation to the motion of the piston.

The arrangement of the present invention introduces a distortion in the drive of the cam shaft, which distortion is in the same sense and of the same magnitude as that introduced (because of the angularity of the connecting rod) in the motion of the piston with relation to the motion of the driving wheel. Therefore, in the arrangement of the invention, the cam shaft is driven in true phase relation to the motion of the piston; and as a result the valve events in relation to piston stroke are free of distortion on both the forward and return strokes.

For accuracy in the correction of distortion of valve events, the offset of the axis of the driving gear 29 from the center a of the driving wheel, and the location of the actuating center of the gear-driving crank should be determined as follows:

The center of the connection (or crank pin) of the gear-driving crank should be so located circumferentially of the wheel as to lie on the line a—33a (see Figure 4), i. e., a line passing through the center of the driving wheel and of the main crank pin 33 when the main crank pin 33 is in position corresponding to mid stroke position of the piston. The center c of gear 29 should be located at the point of intersection of line x—x with a line drawn through the positions of the driving center of the gear-driving crank corresponding to the mid position of the piston in its forward and return strokes. In view of this, in the arrangement of Figure 3, where the gear is driven from a relatively short crank 41, the extent of offset of the gear is quite small as compared with the offset required where the main crank pin 33 of the wheel is used as the driving element for the gear, as in the diagram of Figure 4.

It is also noted that the periodic acceleration and deceleration of the gear 29 (and thus also of the cam shaft) with respect to the driving wheel is such that the point of maximum lag coincides with the crank position corresponding to the mid position of the piston in its forward stroke and such that the point of maximum lead coincides with the crank position corresponding to the mid position of the piston in its return stroke. This relation, of course, is inverted during reverse operation of the locomotive.

Although, in principle, the drive for the gear 29 could be taken directly from the main crank 33 in the general manner diagrammed in Figure 4, for structural reasons it is preferred to employ an arrangement such as that shown in Figures 2 and 3 which, although structurally different, nevertheless effects the same drive relationship. As above brought out, the gear 29 is mounted in the housing 28 eccentrically with relation to the return crank pin 30 and thus also with relation to the center of the drive wheel. The desired distortion of drive of gear 29 is secured from the drive element 41 which, in effect, is a crank bearing the same angular relationship to the associated parts as does the main crank pin 33 of the diagram of Figure 4.

I claim:

1. In a steam engine having a cylinder with a piston therein, and a rotatable driven element with a driving crank and a connecting rod, steam distribution and control mechanism comprising valve means and valve gear including rotatable cam means for actuating the valve means, and means for driving the cam means in 1:1 ratio with the driven element but with periodic angular acceleration and deceleration of the cam means with relation to the driven element, the cam driving means being arranged so that the point of maximum lag is attained at the crank position corresponding to mid position of the piston during its stroke toward the head end of the cylinder and the point of maximum lead is attained at the crank position corresponding to mid position of the piston on its return stroke.

2. In a steam engine having a cylinder with a piston therein, and a rotatable driven element with a driving crank and a connecting rod, steam distribution and control mechanism comprising valve means and valve gear including a rotatable valve controlling member and means for driving the controlling member in timed relation to the driven element but with alternate angular acceleration and deceleration of the rotatable member with relation to the driven element, said driving means being arranged so that the point of maximum lag is attained at the crank position corresponding to mid position of the piston during its stroke toward the head end of the cylinder and the point of maximum lead is attained at the crank position corresponding to mid position of the piston on its return stroke.

3. In a steam engine having a cylinder with a piston therein, and a rotatable driven element with a driving crank and a connecting rod, in which construction the motion of the piston is distorted from true phase relation to the motion of the driven element because of the angularity of the connecting rod at crank positions corresponding to the mid positions in the two strokes of the piston in each cycle of operation, steam distribution and control mechanism comprising valve means and valve gear including a rotatable valve controlling member, and means for driving the controlling member in time relation to the driven element but with distortion from true phase relation to the motion of the driven element, the driving means being arranged so that said distortion substantially corresponds to and is in phase with the distortion which exists as between the motions of the piston and the driven element, whereby the motions of the piston and of the rotatable valve controlling member bear a substantially true phase relation to each other.

4. In a steam engine having a cylinder with a piston therein, and a rotatable driven element with a driving crank and a connecting rod, steam distribution and control mechanism comprising valve means and valve gear including a rotatable valve controlling member, a gear for driving said controlling member and a driving connection from the driven element to said gear providing for drive of said gear in timed relation to the driven element but with alternate angular acceleration and deceleration of the rotatable member with relation to the driven element, the driving connection being arranged so that the point of maximum lag is attained at the crank position corresponding to mid position of the piston during its stroke toward the head end of the cylinder and the point of maximum lead is attained at the crank position corresponding to mid position of the piston on its return stroke.

5. In a steam engine having a cylinder with a piston therein, and a rotatable driven element with a driving crank and a connecting rod, steam distribution and control mechanism comprising valve means and valve gear including a rotatable valve controlling member, a gear for driving said controlling member, said gear being mounted in association with the driven element on an axis parallel to but offset from the axis of the driven element in a direction toward the cylinder and piston, and drive mechanism interconnecting the driven element and said gear including a crank and a lost motion connection operative in a radial sense so as to make accommodation for the eccentricity of the gear with relation to the driven element, the extent of offset of the gear being such as to bring the gear axis substantially to a line passing through the center of the gear-driving crank in its two positions in the cycle of operation in which the piston is in mid position.

6. In a steam engine having a cylinder with a piston therein, a crosshead, a rotatable driven element with a main driving crank and a connecting rod pivoted to the crosshead, steam distribution and control mechanism comprising valve means and valve gear including a rotatable valve controlling member, a gear for driving said controlling member, said gear being mounted in association with the driven element on an axis parallel to but offset from the axis of the driven element in a direction toward the cylinder and piston, and drive mechanism interconnecting the driven element and said gear including a crank and a lost motion connection operative in a radial sense so as to make accommodation for the eccentricity of the gear with relation to the driven element, the center of the connection of the gear-driving crank with the gear being located on a line passing through the center of the driven element and through the center of the main driving crank pin when the crosshead and the main driving crank are in positions corresponding to the mid-stroke position of the piston, and the extent of offset of the gear being such as to bring the gear axis substantially to a line passing through the center of the connection of the gear-driving crank with the gear in its two positions in the cycle of operation in which the piston is in mid position.

ROBERT W. GREGSON.

REFERENCES CITED

The following references are of record in the file of this patent:

UNITED STATES PATENTS

| Number | Name | Date |
| --- | --- | --- |
| 1,597,430 | Brown | Aug. 24, 1926 |
| 1,927,524 | Mueller | Sept. 19, 1933 |